United States Patent
Zhu et al.

(10) Patent No.: US 8,654,740 B2
(45) Date of Patent: Feb. 18, 2014

(54) POLAR CAP RESET METHOD FOR DIFFERENTIAL CODEBOOK FOR WIRELESS COMMUNICATIONS

(75) Inventors: Yuan Zhu, Beijing (CN); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 12/567,364

(22) Filed: Sep. 25, 2009

(65) Prior Publication Data

US 2011/0075650 A1    Mar. 31, 2011

Related U.S. Application Data

(60) Provisional application No. 61/156,882, filed on Mar. 3, 2009.

(51) Int. Cl.
    *H04W 4/00*    (2009.01)
(52) U.S. Cl.
    USPC ............ 370/332; 370/335; 370/336; 370/337; 370/344; 370/347; 370/478; 370/479; 370/480
(58) Field of Classification Search
    USPC .................. 370/319–322, 332, 344–347; 375/130–149
    See application file for complete search history.

(56) References Cited

U.S. PATENT DOCUMENTS

| | | | |
|---|---|---|---|
| 7,881,247 B2 * | 2/2011 | Pan et al. ...................... | 370/319 |
| 7,885,348 B2 | 2/2011 | Li et al. | |
| 2007/0195974 A1 * | 8/2007 | Li et al. ...................... | 381/94.3 |
| 2008/0112500 A1 * | 5/2008 | Pan et al. ...................... | 375/267 |

FOREIGN PATENT DOCUMENTS

| | | |
|---|---|---|
| EP | 1919098 | 5/2008 |
| KR | 10200700218 A | 2/2007 |
| WO | 20030185310 A1 | 10/2003 |
| WO | 2007092539 A2 | 8/2007 |
| WO | 20070254607 A1 | 11/2007 |
| WO | 2008021396 | 2/2008 |
| WO | 2008098092 | 8/2008 |
| WO | 2010101816 A2 | 9/2010 |

OTHER PUBLICATIONS

Li, Qinghua et al., "Codebook design for IEEE 802.16m MIMO Schemes", IEEE 802.16 Broadband Wireless Access Working Group, Sep. 12, 2009.

Office Action received for Japanese Patent Application No. 2011-552219, mailed Mar. 5, 2013, 5 pages including 3 pages English translation.

Office Action received for Korean Patent Application No. 10-2011-7020638, mailed Oct. 30, 2012, 10 pages including 5 pages English translation.

\* cited by examiner

*Primary Examiner* — Alvin Zhu
(74) *Attorney, Agent, or Firm* — Kacvinsky Daisak PLLC (57) ABSTRACT

Techniques for periodically resetting the polar cap for a differential codebook precoding scheme for wireless communications are described. An apparatus may comprise a fixed device for a mobile broadband communications system utilizing an orthogonal frequency-division multiple access technique, the fixed device having a precoding module operative to generate a precoding matrix using a received first codeword of a first base codebook, subsequently reconstruct the precoding matrix using a received polar-cap codeword of a polar-cap codebook, and periodically reset the precoding matrix to clear accumulated error at the fixed device using a received second codeword of a second base codebook. Other embodiments are described and claimed.

15 Claims, 6 Drawing Sheets

POLAR CAP RESET METHOD FOR DIFFERENTIAL CODEBOOK FOR WIRELESS COMMUNICATIONS

This application claims priority to the commonly-owned provisional patent application U.S. Ser. No. 61/156,882, entitled "ADVANCED WIRELESS COMMUNICATION SYSTEM AND TECHNIQUES", filed Mar. 3, 2009, which is incorporated herein by reference in its entirety.

BACKGROUND

Multiple-Input Multiple-Output (MIMO) is a promising technology designed to improve system performance for next generation wireless communications. When a MIMO system uses Spatial Division Multiplexing (SDM) of multiple modulation symbol streams to a single user using the same time/frequency resource, it is referred to as a Single-User MIMO (SU-MIMO) system. When a MIMO system uses SDM of multiple modulation symbol streams to different users using the same time/frequency resource, it is referred to as a Multi-User MIMO (MU-MIMO) system.

MU-MIMO has been of particular interest due to its strength of benefiting from both multi-user diversity and spatial diversity. Further, MU-MIMO can provide large cell throughput by implementing a differential codebook precoding scheme. Enhancements for differential codebook precoding schemes may enhance overall MU-MIMO performance. It is with respect to these and other considerations that the present improvements have been needed.

DETAILED DESCRIPTION

Various embodiments may be generally directed to communication techniques for a wireless communications network, such as a mobile broadband communications system. Some embodiments may be particularly directed to enhanced techniques for a differential codebook precoding scheme for a closed loop MU-MIMO scheme (MU-MIMO).

The Internet is leaping towards mobile applications. This evolution is demanding ubiquitous communications at high data rates. Mobile broadband communications systems utilizing orthogonal frequency-division multiplexing (OFDM) and orthogonal frequency-division multiple access (OFDMA) techniques are emerging as one of the dominant technologies to fulfill high data rate demands.

Mobile broadband communications systems implementing MU-MIMO has been of particular interest due to its strength of benefiting from both multi-user diversity and spatial diversity. Further, MU-MIMO can provide larger cell throughput relative to SU-MIMO by exploiting channel state information at the transmitter and by utilizing a differential codebook precoding scheme. To realize these and other advantages, however, techniques to reset the polar cap for the differential codebook precoding scheme may be desired. This need may result in spectrum efficiency loss for many systems.

To solve these and other problems, various embodiments are directed to polar cap reset techniques for a differential codebook precoding scheme wherein periodic resetting of one or more precoding matrices and/or polar caps for a plurality of mobile devices is coordinated among the plurality of mobile devices and a fixed device to mitigate spectrum efficiency loss. The polar cap reset techniques include, in some embodiments, a fixed device and one or more mobile devices, wherein the devices periodically exchange codewords corresponding to codebooks for generating precoding matrices. In some embodiments, differences may accumulate between the precoding matrix at the fixed device and at the one or more mobile devices. A periodic reset may be required to clear the accumulated error. Other embodiments are described and claimed.

Some embodiments are directed to fixed devices. One embodiment, for example, is directed to a fixed device for a mobile broadband communications system utilizing an OFDMA technique. The fixed device may have a precoding module operative to generate a precoding matrix using a received first codeword of a first base codebook, subsequently reconstruct the precoding matrix using a received polar-cap codeword of a polar-cap codebook, and periodically reset the precoding matrix to clear accumulated error at the fixed device using a received second codeword of a second base codebook.

Some embodiments are directed to mobile devices. One embodiment, for example, is directed to a mobile device (e.g., a mobile subscriber station) for a mobile broadband communications system utilizing an OFDMA technique. The mobile device may include a polar-cap codebook module operative to generate a first codeword of a first base codebook, subsequently generate a polar-cap codeword of a polar-cap codebook, the polar-cap codeword representing changes in a channel since generation of the first base codeword, and periodically generate a second codeword of a second base codebook. It should be understood that while first and second base codebooks are described, the first and second codebooks may be the same or different codebooks. Furthermore, the first and second base codebooks are both typically larger, more complete codebooks that the polar-cap codebook that represents changes in the channel and, therefore has a codeword that uses fewer bits that a full base codeword of a full base codebook. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
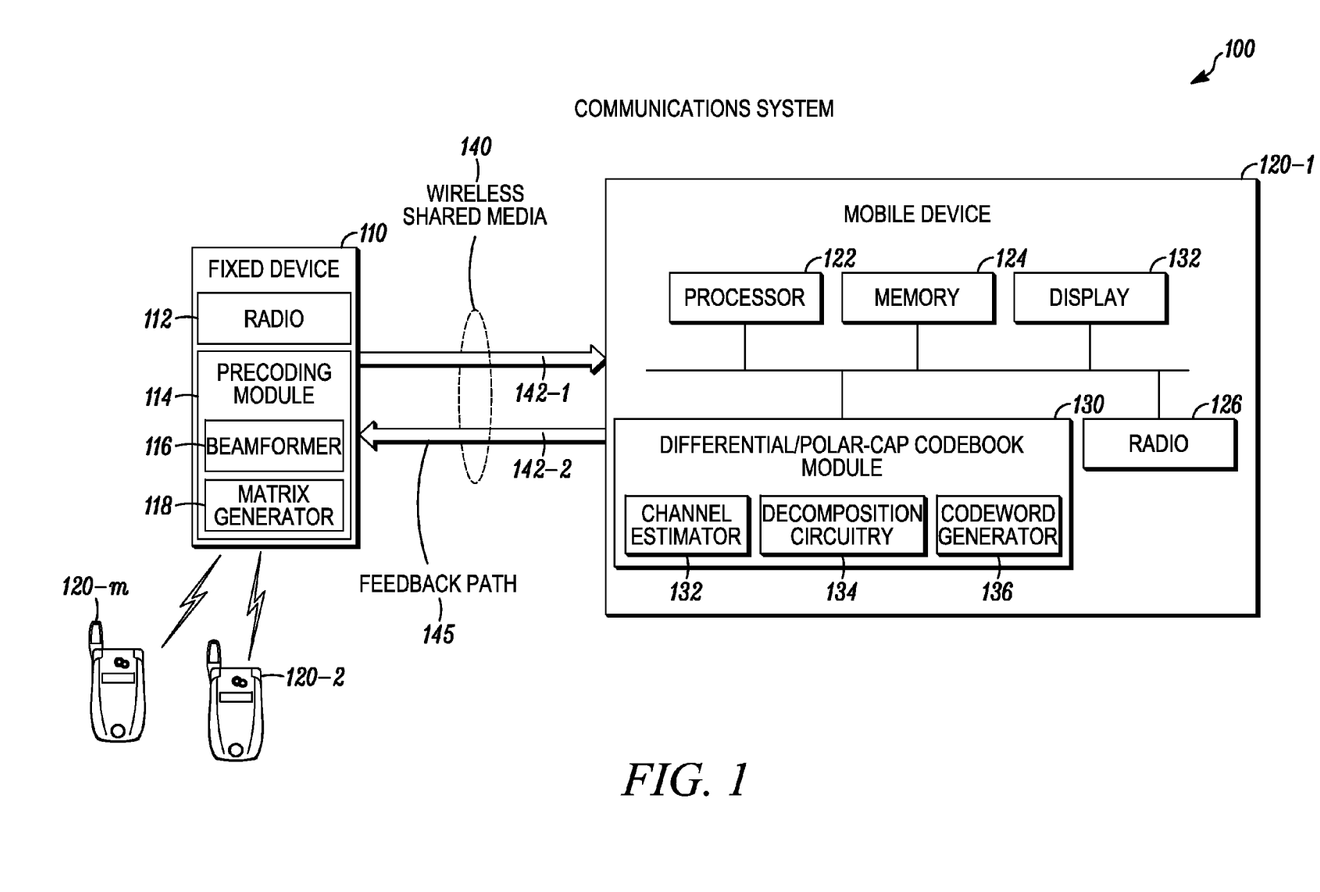
FIG. 1 illustrates one embodiment of a communications system.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links, such as wireless shared media 140. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers"), radios, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as a fixed device 110 and a set of mobile devices 120-1-$m$, all of which communicate via wireless shared media 140. The fixed device may further include a radio 112, a precoding module 114, a beamformer 116 and a matrix generator 118. As shown by the mobile device 120-1, the mobile devices 120-1-$m$ may further include a processor 122, a memory unit 124, a radio 126, a differential/polar-cap codebook module 130, a channel estimator 132, decomposition circuitry 134 and codeword generator 136. The embodiments, however, are not limited to the elements shown in FIG. 1 or to the arrangement shown in FIG. 1.

In various embodiments, the communications system 100 may comprise or be implemented as a mobile broadband communications system. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e-2005) are Physical (PHY) layer specifications. WiMAX II is an advanced Fourth Generation (4G) system based on the IEEE 802.16j and IEEE 802.16m proposed standards for International Mobile Telecommunications (IMT) Advanced 4G series of standards.

Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, and so forth. The embodiments are not limited in this context.

In various embodiments, the communications system 100 may comprise a fixed device 110 having wireless capabilities. A fixed device may comprise a generalized equipment set providing connectivity, management, or control of another wireless device, such as one or more mobile devices. Examples for the fixed device 110 may include a wireless access point (AP), base station or node B, router, switch, hub, gateway, and so forth. In one embodiment, for example, the fixed device may comprise a base station or node B for a cellular radiotelephone system or mobile broadband communications system. The fixed device 110 may also provide access to a network (not shown). The network may comprise, for example, a packet network such as the Internet, a corporate or enterprise network, a voice network such as the Public Switched Telephone Network (PSTN), and so forth. Although some embodiments may be described with the fixed device 110 implemented as a base station or node B by way of example, it may be appreciated that other embodiments may be implemented using other wireless devices as well. The embodiments are not limited in this context.

In various embodiments, the communications system 100 may comprise a set of mobile devices 120-1-$m$ having wireless capabilities. The mobile devices 120-1-$m$ may comprise a generalized equipment set providing connectivity to other wireless devices, such as other mobile devices or fixed devices (e.g., fixed device 110). Examples for the mobile devices 120-1-$m$ may include without limitation a computer, server, workstation, notebook computer, handheld computer, telephone, cellular telephone, personal digital assistant (PDA), combination cellular telephone and PDA, netbook computer, tablet computer and so forth. In one embodiment, for example, the mobile devices 120-1-$m$ may be implemented as mobile subscriber stations (MSS) for a WMAN. Although some embodiments may be described with the mobile devices 120-1-$m$ implemented as a MSS by way of example, it may be appreciated that other embodiments may be implemented using other wireless devices as well. The embodiments are not limited in this context.

As shown by the mobile device 120-1, the mobile devices 120-1-$m$ may comprise a processor 122. The processor 122 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 122 may be implemented as a general purpose processor, such as a processor made by Intel® Corporation, Santa Clara, Calif. The processor 122 may also be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 120-1, the mobile devices 120-1-$m$ may comprise a memory unit 124. The memory 124 may comprise any machine-readable or computer-readable media capable of storing data, including both volatile and non-volatile memory. For example, the memory 124 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 124 may be included on the same integrated circuit as the processor 122, or alternatively some portion or all of the memory 124 may be disposed on an integrated circuit or other medium, for example a hard disk drive, that is external to the integrated circuit of the processor 122. The embodiments are not limited in this context.

As further shown by the mobile device 120-1, the mobile devices 120-1-$m$ may comprise a display 132. Display 132 may comprise any suitable display unit for displaying information appropriate for a mobile computing device. In addition, display 132 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 132.

In one embodiment, for example, display 132 may be implemented by a liquid crystal display (LCD) or other type of suitable visual interface. Display 132 may comprise, for example, a touch-sensitive color (e.g., 56-bit color) display screen. In various implementations, the display 132 may comprise one or more thin-film transistors (TFT) LCD including embedded transistors. In such implementations, the display 132 may comprise a transistor for each pixel to implement an active matrix. While the embodiments are not limited in this context, an active matrix display is desirable since it requires lower current to trigger pixel illumination and is more responsive to change than a passive matrix.

In various embodiments, the devices 110, 120 may communicate information over wireless shared media 140 via respective radios 112, 126. The wireless shared media 140 may comprise one or more allocations of RF spectrum. The allocations of RF spectrum may be contiguous or non-contiguous. In some embodiments, the radios 112, 126 may communicate information over the wireless shared media 140 using various multicarrier techniques utilized by, for example, WiMAX or WiMAX II systems. For example, the radios 112, 126 may utilize various MU-MIMO techniques to perform beamforming, spatial diversity or frequency diversity.

In general operation, the radios 112, 126 may communicate information using one or more communications channels, such as communications channels 142-1-$p$. A communication channel may be a defined set of frequencies, time slots, codes, or combinations thereof. In one embodiment, for example, the transmitting portion of the radio 112 of the fixed device 110 may communicate media and control information to the receiving portion of the radio 126 of the mobile devices 120-1-$m$ using the communications channel 142-1, sometimes referred to as a "downlink channel." In one embodiment, for example, the transmitting portion of the radio 126 of the mobile device 110 may communicate media and control information to the receiving portion of the radio 112 of the fixed device 110 using the communications channel 142-2, sometimes referred to as an "uplink channel." In some cases, the communications channels 142-1, 142-2 may use the same or different set of transmit and/or receive frequencies, depending upon a given implementation.

In various embodiments, communications system 100 may comprise a closed-loop MIMO communications system. Closed-loop MIMO systems typically transmit channel state information from a receiver to a transmitter over a feedback path 145. The channel state information may be used to employ beamforming to compensate for the current channel conditions increasing signal-to-noise (SNR) levels at the receiver. In some embodiments a precoding matrix may be generated at the receiver based on the channel conditions. The precoding matrix may then be provided to the transmitter as feedback. This feedback consumes bandwidth that might otherwise be available for data traffic. To reduce the overhead associated with this feedback, codewords of a known codebook may be provided instead of an actual precoding matrix. The codewords may indicate which precoding matrix is to be used by the transmitter.

In MIMO systems, the size of the codebooks may increase significantly with the number of transmit antennas and the number of transmitted data streams. In some embodiments, the size of the codebook may be based on the number of transmit antennas and the number of data streams. This may result in a significant increase in feedback.

In various embodiments, a series of codebooks may be used to efficiently encode a precoding matrix. Full-space, full-manifold or base codebooks may help minimize feedback in the uplink for selecting a precoding matrix to be used in the downlink. In some embodiments, a set of smaller polar-cap or differential codebooks may be used to correct for channel drift over time. The use of these smaller polar-cap codebooks may enable a further reduction in the amount of feedback, since polar-cap codebooks may be smaller than base codebooks and therefore utilize codewords that use fewer bits on the channel. In some embodiments, the size may comprise the number of codewords in the codebook and the spread or range of codewords in the differential codebook may be smaller than the spread or range of codewords in the base codebook. For example, the codeword distribution of the differential codebook may have a higher concentration than that of the base codebook. Other embodiments are described and claimed.

In various embodiments, fixed device 110 comprises beamformer 116 to weight received data signals by a precoding matrix. Fixed device 110 may also comprise transmit antennas (not shown) to transmit the weighted data signals. In some embodiments, fixed device 110 may also include matrix generator 118 to generate a precoding matrix from a codeword received from mobile device 120-1. For example, the codeword may be from a base codebook or a polar-cap codebook.

Mobile device 120-1 may include one or more receive antennas (not shown) to receive signals transmitted through wireless shared media 140 by fixed device 110, and channel estimator 132 for determining a channel matrix which describes the current state of wireless shared media 140 channel. In various embodiments, mobile device 120-1 may also include decomposition circuitry 134 to decompose the channel matrix into several additional matrices, including the precoding matrix. Mobile device 120-1 may also include codeword generator 136 to quantize the precoding matrix and generate codewords of either a base codebook or a polar-cap codebook for transmission to fixed device 110 over feedback path 145. Other embodiments are described and claimed.

In various embodiments, use of a differential codebook may result in precoding matrices at the fixed device 110 and the mobile device 120-1 that are iteratively tracked to approach that of an ideal precoding matrix using a small number of feedback bits. For example, the iterative precoding matrix tracking approach can be described using the following equations:

Differential at mobile device 120-1:

$$D=[\hat{V}(t-1)\hat{V}^\perp(t-1)]^H V(t) \qquad \text{Equation (1)}$$

Quantization at mobile device 120-1:

$$\hat{D}=\arg_{D_i=C_d}\max\|D^H D_i\|_F \qquad \text{Equation (2)}$$

Beamforming matrix reconstruction at fixed device 110:

$$\hat{V}(t)=[\hat{V}(t-1)\hat{V}^\perp(t-1)]\hat{D} \qquad \text{Equation (3)}$$

Beamforming at fixed device 110:

$$y=H\hat{V}(t)s+n \qquad \text{Equation (4)}$$

In view of the above questions, in some embodiments, the quantized precoding matrix $\hat{V}(t-1)$ at time step $t-1$ may be used to construct a base matrix $[\hat{V}(t-1)\hat{V}^\perp(t-1)]$ at both the fixed device 110 and the mobile device 120-1. The measured precoding matrix V(t) may be projected to the full space and the projection vector D will be quantized using a differential codebook $C_d$ and the quantized projection vector $\hat{D}$ will be used to reconstruct precoding matrix $\hat{V}(t)$ at the fixed device 110 and beamform data to the mobile device 120-1.

In these embodiments, feedback may be reduced using the differential codebook precoding scheme because the polar-cap codebook or polar-cap codeword may be much smaller in size than the base codebook and/or base codeword. Accordingly, the codeword of the polar-cap codebook may be represented by fewer bits than codewords of the base codebook.

The foregoing may be better illustrated by way of example. In some embodiments, the fixed device 110 may have data to send to the mobile device 120-1. In various embodiments, for example, the fixed device 110 may send a request-to-send (RTS) packet to the mobile device 120-1. The mobile device 120-1 may calculate an initial or base precoding matrix based on the receipt of the RTS packet and may send a codeword of a base codebook to fixed device 110 in a clear-to-send (CTS) packet. The fixed device 110 may apply beamforming coefficients based on the codeword of the base codebook for transmitting a data packet to the mobile device 120-1. Based on the receipt of the data packet, the mobile device 120-1 may generate a codeword of a polar-cap codebook representing the deviations, changes or variations in the channel since the generation of the codeword of the base codebook. In various embodiments, the mobile device 120-1 may transmit the codeword of a polar-cap codebook to the fixed device 110 within an acknowledge (ACK) packet.

In some embodiments, the fixed device 110 may apply beamforming coefficients based on the codeword of the polar-cap codebook for transmitting a next data packet to the mobile device 120-1. In some embodiments, the iterative feedback process may continue with the mobile device 120-1 receiving subsequent packets from the fixed device and then generating and providing subsequent codewords of one or more polar-cap codebooks to the fixed device 110, wherein the fixed device then updates the precoding matrix.

In various embodiments, the differential codebook precoding scheme may result in the precoding matrix at the fixed device 110 and the precoding matrix at the mobile device 120-1 converging to different states. For example, error may accumulate at the fixed device 110. In some embodiments, the error may comprise differences between the precoding matrix at the fixed device 110 and one or more precoding matrices of one or more mobile devices 120-1-$m$. As a result of the possible error propagation scenario, a periodic reset is needed to clear the cumulated error at fixed device 110. This periodic reset may cause spectrum efficiency loss. In various embodiments, the periodic reset of the precoding matrix and/or polar cap of the mobile devices 120-1-$m$ may be coordinated among a plurality of mobile devices to mitigate the spectrum efficiency loss. Other embodiments are described and claimed.

In various embodiments, mobile device 120-1 may include a polar-cap codebook module 130. Polar-cap codebook module 130, while shown in FIG. 1 as having a limited number of modules, may have any number, type or arrangement of modules and still fall within the described embodiments. Polar cap-codebook module 130 may be operative to generate a first codeword of a first base codebook and transmit the first codeword to fixed device 110. The first codeword may be generated and transmitted as described above.

Fixed device 110 may have a precoding module 114 in some embodiments. Precoding module 114, while shown in FIG. 1 as having a limited number of modules, may have any number, type or arrangement of modules and still fall within the described embodiments. In some embodiments, precoding module 114 may be operative to generate a precoding matrix using the first codeword of a first base codebook received from mobile device 120-1 over wireless shared media 140, for example. The first base codebook may correspond to a full-space base precoding matrix in some embodiments.

Mobile device 120-1 may receive one or more packets transmitted based on the first base codebook and may subsequently generate a polar-cap codeword of a polar-cap codebook in some embodiments. In various embodiments, the polar-cap codeword may represent changes in a channel since generation of the first base codeword. Mobile device 120-1 may transmit the polar-cap codeword to the fixed device 110 using, for example, feedback path 145. Upon receipt of the polar-cap codeword, fixed device 110 may subsequently reconstruct the precoding matrix using the received polar-cap codeword of the polar-cap codebook. This process of receiving packets and generating a polar-cap codeword representing changes in the channel may be repeated for any number of times or for any time period resulting in continued refinements of the channel between the fixed device 110 and the mobile device 120-1 without having to retransmit a full-space or base codeword.

Ideal performance of the differential codebook precoding scheme would result in no feedback error, and there would be no need to reset the polar cap or precoding matrix and spectrum efficiency could approach its upper bound. However, in various embodiments, continued use of the differential codebook precoding scheme may result in error being accumulated at fixed device 110.

In some embodiments, mobile device 120-1 may periodically generate a second codeword of a second base codebook that, when received by fixed device 110, results in fixed device 110 resetting the precoding matrix to clear any accumulated error at the fixed device 110. In various embodiments, generating the periodic reset of the precoding matrix may comprise generating a new full space matrix and/or resetting the polar cap for a plurality of mobile devices. For example, the second codeword of the second base codebook may correspond to a full space matrix based on the most recent downlink transmission and fixed device 110 may use the second codeword to generate a second full space matrix, from which the differential codebook precoding process may start again. It should be understood that while first and second base codebooks are described, the first and second codebooks may be the same or different codebooks. Furthermore, the first and second base codebooks are both typically larger, more complete codebooks that the polar-cap codebook. Other embodiments are described and claimed.

In various embodiments, fixed device 110 may be communicating over wireless shared media 140 with a plurality of mobile devices 120-1-m. In some embodiments, the periodic reset of the precoding matrix by the precoding module 114 of the fixed device 100 may be coordinated among the plurality of mobile devices 120-1-m to mitigate spectrum efficiency loss.

Figure 2:
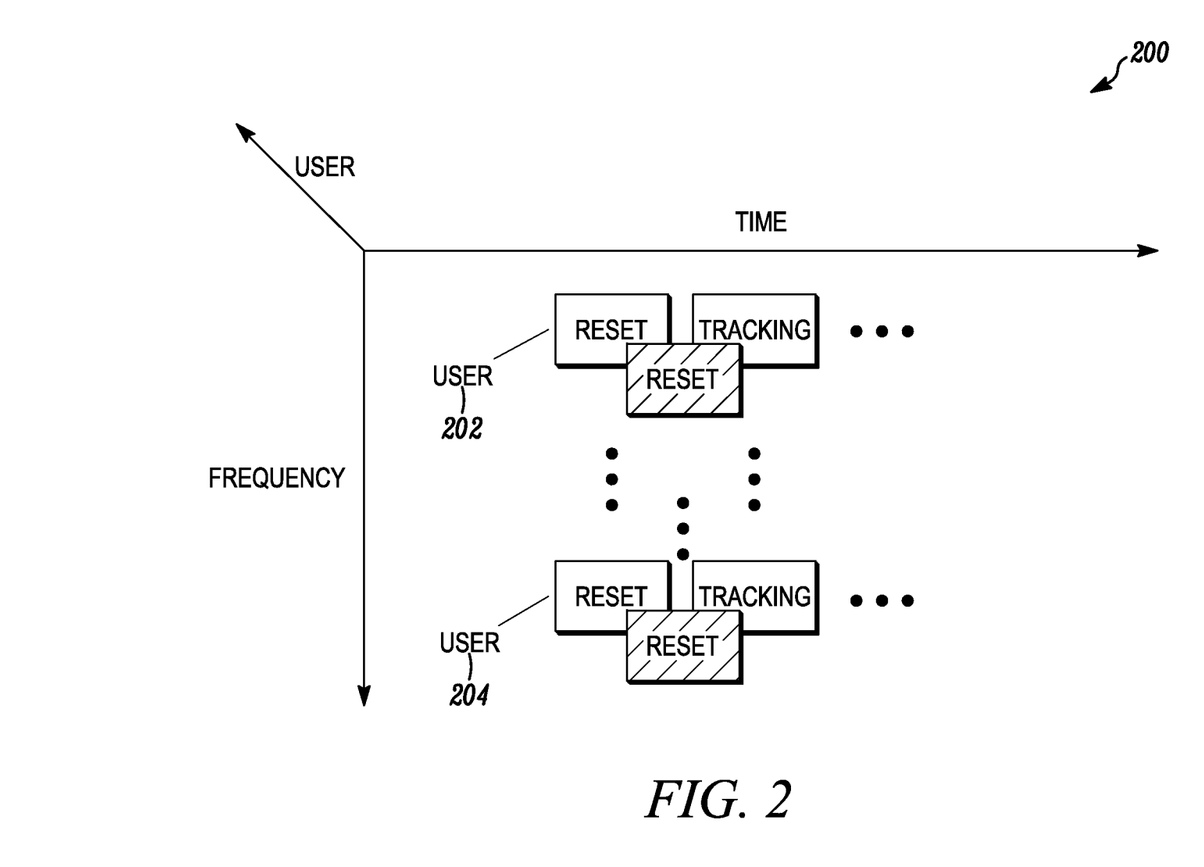
FIG. 2 illustrates one embodiment of a first user diagram.
Figure 3:
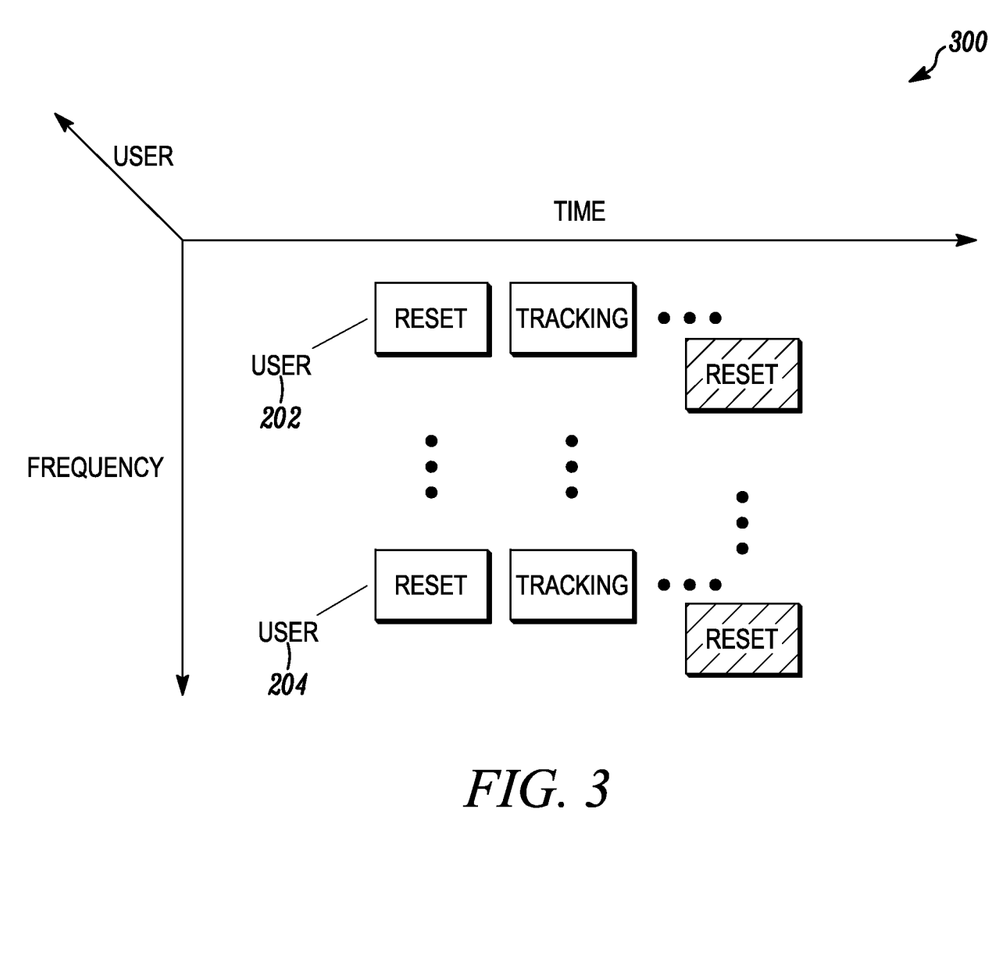
FIG. 3 illustrates one embodiment of a second user diagram.
Figure 4:
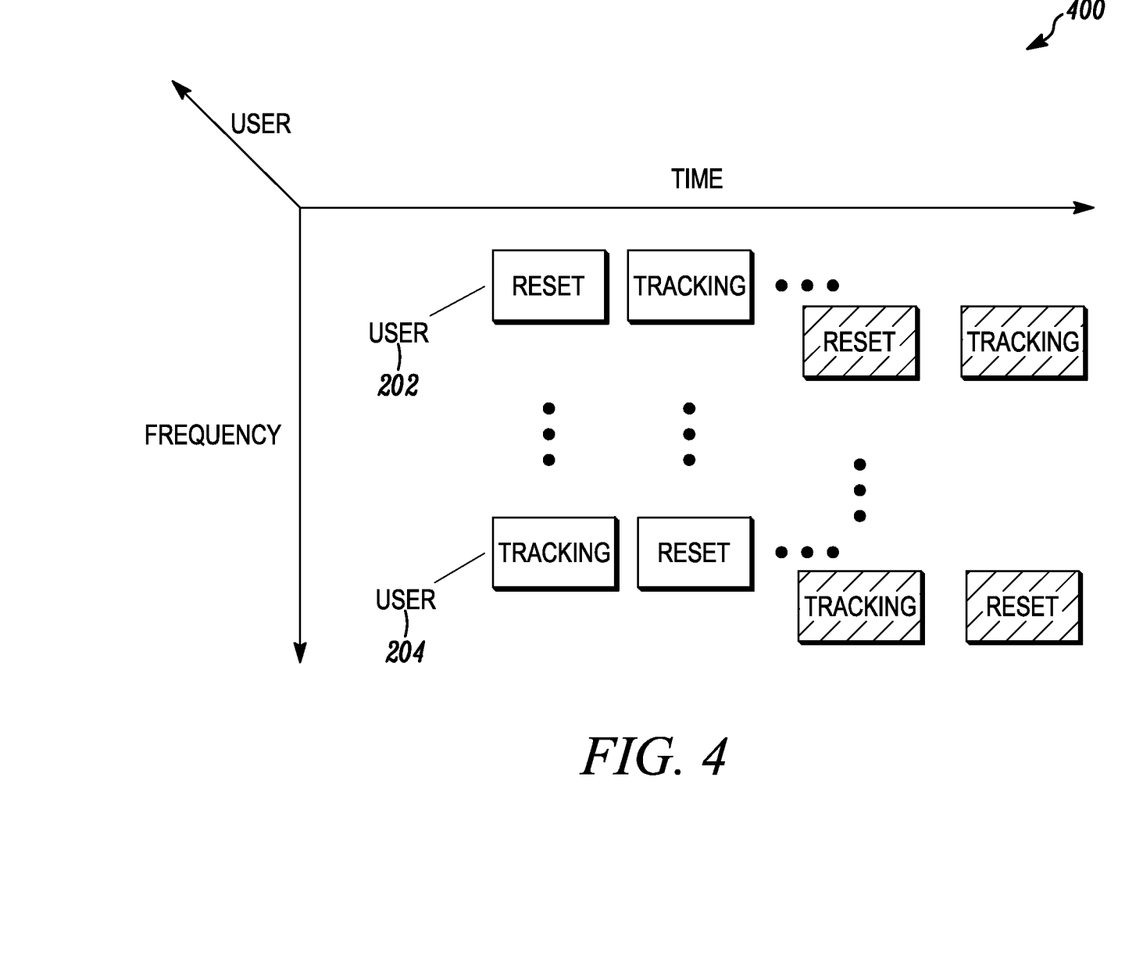
FIG. 4 illustrates one embodiment of a third user diagram.

FIGS. 2-4 illustrate embodiments of user diagrams 200, 300 and 400 respectively. User diagrams 200, 300 and 400 show two users, user 202 and user 204, in time and frequency during the reset and tracking periods of the differential codebook precoding reset scheme described above. In some embodiments, the tracking period may correspond to the periodic updates of a polar-cap codeword between mobile devices 120-1-m and fixed device 110 and the reset period may correspond to the generation of a new base codeword for use in generating a new base precoding matrix at the fixed device 110. It should be noted that while a specific number of users are shown by way of example, it may be appreciated that more or less users may be used and still fall within the described embodiments.

In the illustrated embodiment shown in FIG. 2, the precoding matrix for the plurality of mobile devices, e.g. users 202 and 204, is reset in the same sub-frame. For example, all users polar caps of all sub-bands or the precoding matrix for each user may be reset in the same frame. In various embodiments, the plurality of mobile devices 120-1-m may generate and transmit the second codeword (e.g. the second base codeword) during the same sub-frame. The coordination of the generation and transmission may be controlled by fixed device 110 in some embodiments or may be coordinated by the mobile devices 120-1-m through established communication channels between the mobile devices. In some embodiments, when the polar caps of all users are reset at the same time, the fixed device 110 may experience one sudden capacity drop since all reported channel quality information (CQI) may drop instantaneously for one frame.

As shown in FIG. 3, time domain multiplexing may be utilized in some embodiments to reset the precoding matrix or polar cap for the plurality of mobile devices in different sub-frames. In various embodiments, the method shown in FIG. 3 may utilize multi-user diversity to mitigate any reset caused spectrum efficiency loss. In some embodiments, the plurality of mobile devices 120-1-m may be coordinated by fixed device 110 to utilize time domain multiplexing to generate and transmit the second codeword for the plurality of mobile devices in different sub-frames. For example, fixed device 110 may reset the base precoding matrix for a plurality of mobile devices 120-1-m at different times based on the varied receipt of second base codewords from the mobile devices 120-1-m, thereby avoiding the sudden drop in CQI associated with resetting all users at the same time.

FIG. 4, in some embodiments, illustrates the use of time and frequency domain multiplexing to reset the precoding matrix or polar cap for the plurality of mobile devices using different sub-frames and different frequencies. For example, the mobile devices 120-1-m may utilize time and frequency domain multiplexing to generate and transmit the second codeword to the fixed device 110 using different sub-frames and different frequencies. Using this approach, in some embodiments, while one sub band is in a reset state, the other sub bands are in tracking state. In various embodiments, the method illustrated in FIG. 4 distributes the reset caused capacity loss equally among all frames and utilizes multi user diversity to mitigate the spectrum efficiency loss. Other embodiments are described and claimed.

Figure 5:
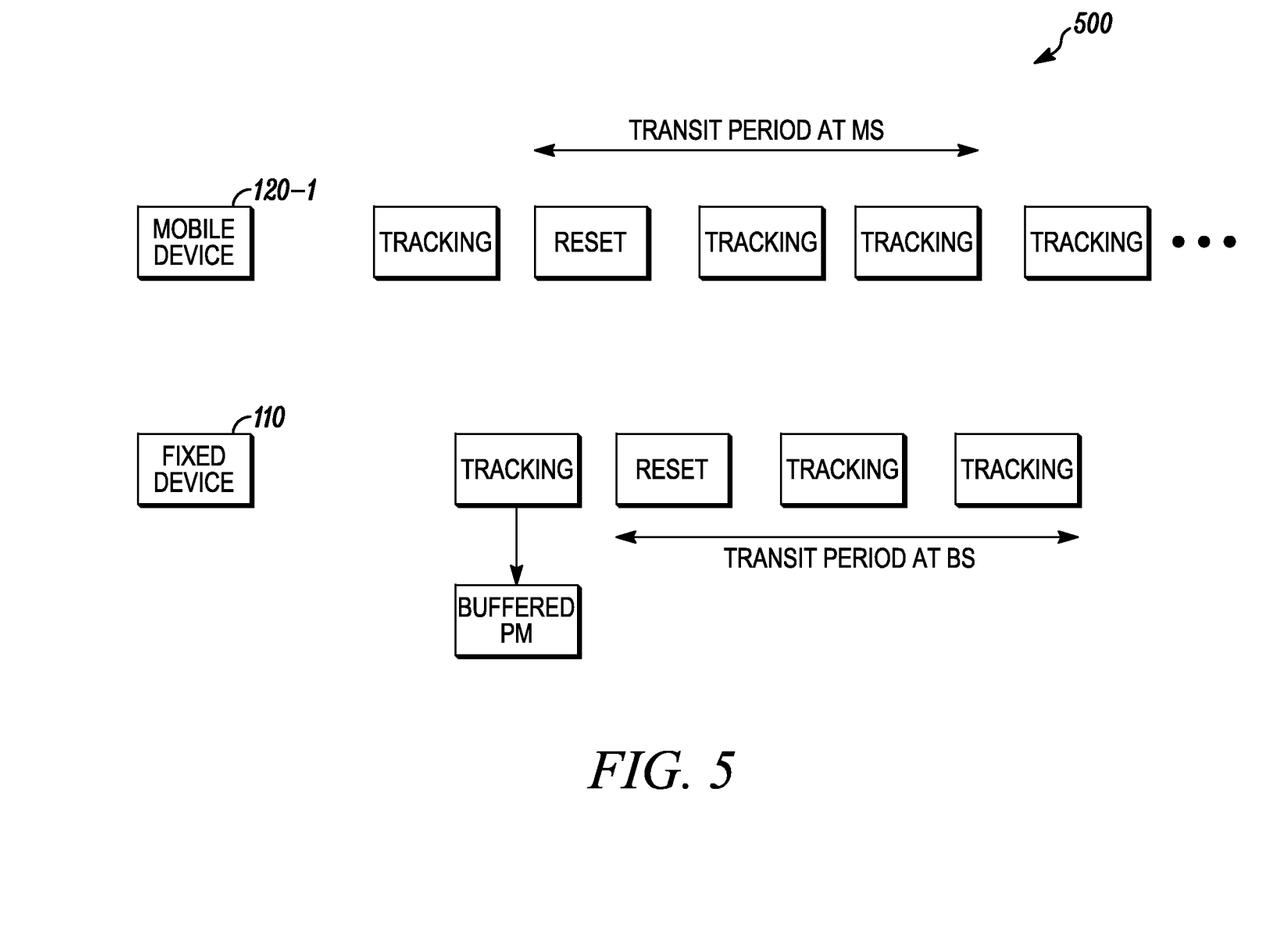
FIG. 5 illustrates one embodiment of a fourth user diagram.

In various embodiments, the timing diagram illustrated in FIG. 5 may be utilized in addition to and/or in conjunction with any of the above described embodiments of FIGS. 1-4 to further reduce spectrum efficiency loss associated with polar cap reset. FIG. 5, for example, illustrates a defined a transit period. In various embodiments, the defined transit period comprises one sub band starting from a frame when one sub band is reset. The transit period can last for several frames, for example three frames as shown in FIG. 5. Other embodiments are described and claimed.

In various embodiments, the polar-cap codebook module 130 may be operative to transmit the second codeword of the second base codebook to the fixed device 110 as described above. In some embodiments, however, the transmission may occur after a defined transit period. In various embodiments, the precoding module 114 may receive the second codeword of the second base codebook from the mobile device 120-1 after a defined transit period reset the precoding matrix based on the received second codeword. In some embodiments, the polar-cap codebook module 130 may track channel conditions using a precoding matrix based on a previously transmitted codeword until a precoding matrix based on the second codeword is received from the fixed device 110. Other embodiments are described and claimed.

In some embodiments, as shown in FIG. 5, mobile device 120-1 will continue to use the converged precoding matrix of the frame before reset for precoding during the transit period. Subsequently, the mobile device 120-1 may reset and track a new precoding matrix and feedback the quantized differential precoding matrix index to the fixed device 110. In some embodiments, fixed device 110 will use this feedback to create and track a new precoding matrix for the new transit period. Mobile device 120-1 may begin to use the new precoding matrix after the transit period in some embodiments. Mobile device 120-1 may use the old precoding matrix to estimate CQI and feedback the CQI during the transit period or mobile device 120-1 can use the new precoding matrix to estimate CQI, for example. In some embodiments, if the new precoding matrix is used to estimate CQI, fixed device 110 may ignore this CQI during the transit period and continue to use the CQI converged before the transit period.

In various embodiments, the use of the transit periods described above can work in conjunction with any of the above described reset techniques in FIGS. 1-4. In some embodiments, this technique may utilize the time correlation of CQI and PMI, especially for highly correlated channels.

Figure 6:
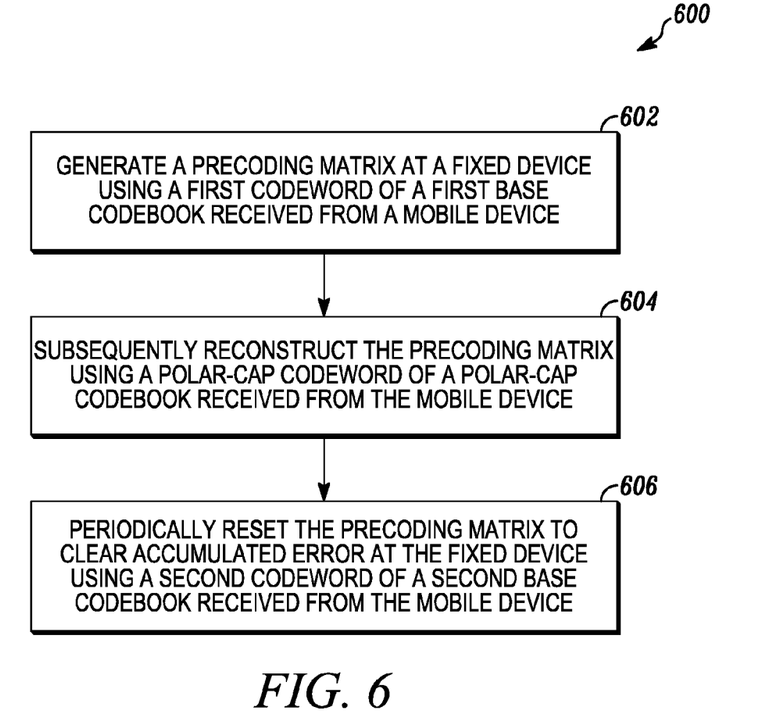
FIG. 6 illustrates one embodiment of a first logic flow.

FIG. 6 illustrates one embodiment of a logic flow 600. The logic flow 600 may be representative of the operations executed by one or more embodiments described herein, such as one or both of the devices 110, 120-1-$m$. For instance, the logic flow 600 may be implemented by fixed device 110.

In one embodiment, the logic flow 600 may generate a precoding matrix at a fixed device using a first codeword of a first base codebook received from a mobile device at 602. For example, fixed device 110 may generate a first base precoding matrix after receiving a first base codeword of a first base codebook from mobile device 120-1. Subsequently, at 604, the precoding matrix may be reconstructed using a polar-cap codeword of a polar-cap codebook received from the mobile device. In some embodiments, fixed device 110 may reconstruct the first base precoding matrix based on the received polar-cap codeword of a polar-cap codebook representing changes in the channel since the transmission of the first base codeword.

At 606, the precoding matrix may be periodically reset to clear accumulated error at the fixed device using a second codeword of a second base codebook received from the mobile device. For example, fixed device 110 may receive a second base codeword after one or more polar-cap codeword have been received, the second base codeword corresponding to a full-space or base precoding matrix, wherein the fixed device generates a new full-space or base precoding matrix using the second base codeword.

In some embodiments, a plurality of second codewords of second base codebooks may be received from a plurality of mobile devices in the same sub-frame. For example, a plurality of mobile device 120-1-$m$ may all transmit second codewords after a series of polar-cap codewords, wherein the second codewords are sent by each of the mobile devices 120-1-$m$ at the same time.

In various embodiments, a plurality of second codewords of second base codebooks may be received from a plurality of mobile devices in different sub-frames. For example, time domain multiplexing may be utilized such that the second codewords are received from the plurality of mobile devices 120-1-$m$ at different times. In some embodiments, a plurality of second codewords of second base codebooks may be received from a plurality of mobile devices in different sub-frames and at different frequencies. Time domain and frequency domain multiplexing may be utilized, for example, the ensure receipt of the second codewords at different times and at different frequencies.

In some embodiments, a transit period may be defined and the second codeword of the second base codebook may be received from a mobile device after the defined transit period, wherein the precoding matrix is reset based on the received second codeword. Other embodiments are described and claimed.

Figure 7:
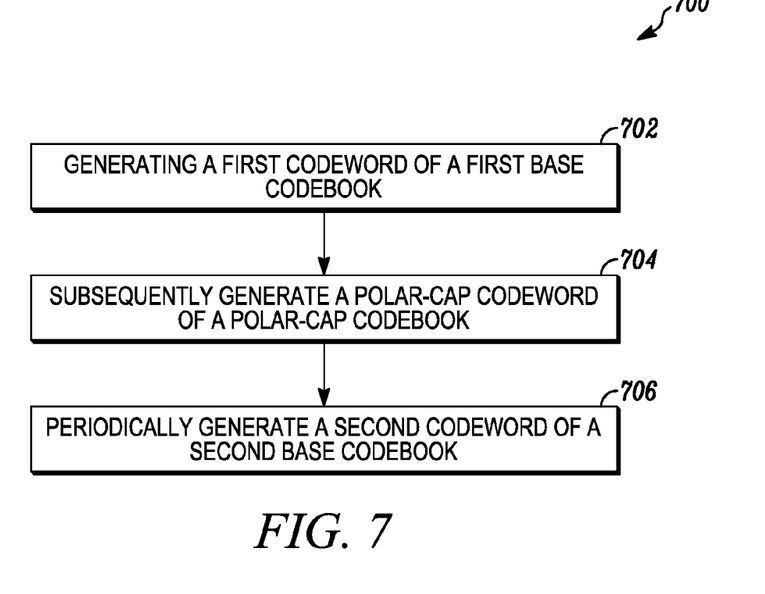
FIG. 7 illustrates one embodiment of a second logic flow.

FIG. 7 illustrates one embodiment of a logic flow 700. The logic flow 700 may be representative of the operations executed by one or more embodiments described herein, such as one or both of the devices 110, 120-1-$m$. For instance, the logic flow 700 may be implemented by one or more of the mobile devices 120-1-$m$.

In one embodiment, the logic flow 700 may generate a first codeword of a first base codebook at 702. For example, mobile device 120-1 may generate a full-space or base codebook and transmit this codebook to fixed device 110 for generation of a full-space precoding matrix. Subsequently, at 704, a polar-cap codeword of a polar-cap codebook may be generated. In various embodiments, the polar-cap codeword represents changes in a channel since generation of the first base codeword.

At 706, a second codeword of a second base codebook may be periodically generated. For example, mobile device 120-1 may periodically generate a new full-space or base codebook to clear error accumulated at the fixed device 110 over time based on a series of transmitted polar-cap codebooks wherein the precoding matrices at the fixed device 110 and mobile device 120-1 drift apart.

In various embodiments, transmission of the second codeword may be coordinated among a plurality of mobile devices to occur in the same sub-frame. For example, mobile devices 120-1-$m$ may all receive reserved time slots on the channel that coincide such that the second codewords are all transmitted to the fixed device 110 at the same time.

In some embodiments, transmission of the second codeword is coordinated among a plurality of mobile devices to occur in different sub-frames. For example, the reserved time for each mobile device may be time domain multiplexed such that each mobile device 120-1-$m$ transmits the second codeword at a different time. In various embodiments, transmission of the second codeword may be coordinated among a plurality of mobile devices to occur in different sub-frames and using different frequencies. For example, time and frequency domain multiplexing may be utilized to ensure that mobile devices 120-1-$m$ transmit the second codewords to fixed device 110 at different times and using different frequencies.

In various embodiments, the second codeword of the second base codebook may be transmitted to a fixed device after a defined transit period. For example, mobile device 120-1 may define a transit period and send the second codeword to fixed device 110 only after completing of the defined transit period. In some embodiments, the mobile device may track channel conditions using a precoding matrix based on the first codeword until a precoding matrix based on the second codeword is received from the fixed device. Other embodiments are described and claimed.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a fixed device for a mobile broadband communications system utilizing an orthogonal frequency-division multiple access technique, the fixed device having a precoding module operative to, for each of a plurality of mobile devices, generate a precoding matrix using a received first codeword of a first base codebook, subsequently reconstruct the precoding matrix using a received polar-cap codeword of a polar-cap codebook, and periodically reset the precoding matrix to clear accumulated error at the fixed device using a received second codeword of a second base codebook, the fixed device to coordinate the periodic resettings of the precoding matrices for the plurality of mobile devices by using time and frequency domain multiplexing to receive the second codewords for the plurality of mobile devices using different subframes and different frequencies, such that when one of a plurality of sub-bands is in a reset state, the other sub-bands are in a tracking state.

2. The apparatus of claim 1, the precoding module operative to:
receive the second codeword for a mobile device after a defined transit period; and
reset the precoding matrix for the mobile device based on the received second codeword.

3. The apparatus of claim 1, wherein the periodic resetting of each precoding matrix comprises generating a new full space matrix.

4. The apparatus of claim 1, wherein the accumulated error comprises differences between the precoding matrix at the fixed device and one or more precoding matrices of one or more mobile devices.

5. The apparatus of claim 1, wherein the polar-cap codeword represents changes in a channel since receiving the first codeword of the first base codebook and the polar-cap codebook comprises a differential codebook wherein a codeword distribution of the differential codebook has a higher concentration than a codeword distribution of the base codebook.

6. The apparatus of claim 1, comprising a digital display.

7. An apparatus, comprising:
a mobile device for a mobile broadband communications system utilizing an orthogonal frequency-division multiple access technique, the mobile device having a polar-cap codebook module to generate a first codeword of a first base codebook, subsequently generate a polar-cap codeword of a polar-cap codebook, the polar-cap codeword representing changes in a channel since generation of the first base codeword, and periodically generate a second codeword of a second base codebook, wherein generation of the second codeword and transmission of the second codeword is coordinated among generation and transmission of a plurality of second codewords for a plurality of mobile devices using time and frequency domain multiplexing, according to which the plurality of second codewords are transmitted using different subframes and different frequencies, such that when one of a plurality of sub-bands is in a reset state, the other sub-bands are in a tracking state.

8. The apparatus of claim 7, wherein the polar-cap codebook comprises a differential codebook having a higher codeword distribution concentration than the base codebook.

9. The apparatus of claim 7, the polar-cap codebook module operative to:

transmit the second codeword of the second base codebook after a defined transit period; and track channel conditions using a precoding matrix based on a previously transmitted codeword until a precoding matrix based on the second codeword is received.

10. The apparatus of claim 7, comprising:

a radio operative to receive one or more signals over a downlink wireless channel and to transmit one or more signals over an uplink wireless channel.

11. The apparatus of claim 7, wherein a precoding matrix is generated using a non-unitary precoding scheme for a closed loop multi-user multiple-input and multiple-output (MIMO) scheme.

12. A method, comprising:

generating at a fixed device, for each of a plurality of mobile devices, a precoding matrix using a received first codeword of a first base codebook;

subsequently reconstructing the precoding matrix for each of the plurality of mobile devices using a received polar-cap codeword of a polar-cap codebook;

periodically resetting the precoding matrix for each of the plurality of mobile devices to clear accumulated error at the fixed device using a received second codeword of a second base codebook; and coordinating the periodic resettings of the precoding matrices for the plurality of mobile devices by using time and frequency domain multiplexing to receive the second codewords for the plurality of mobile devices using different sub-frames and different frequencies, such that when one of a plurality of sub-bands is in a reset state, the other sub-bands are in a tracking state.

13. The method of claim 12, comprising:

receiving the second codeword for a mobile device after a defined transit period; and resetting the precoding matrix for the mobile device based on the received second codeword.

14. A method, comprising:

generating a first codeword of a first base codebook;

subsequently generating a polar-cap codeword of a polar-cap codebook, the polar-cap codeword representing changes in a channel since generation of the first base codeword; and periodically generating and transmitting a second codeword of a second base codebook, the generation and transmission of the second codeword coordinated among generation and transmission of a plurality of second codewords for a plurality of mobile devices using time and frequency domain multiplexing, according to which the plurality of second codewords are transmitted using different sub-frames and different frequencies, such that when one of a plurality of sub-bands is in a reset state, the other sub-bands are in a tracking state.

15. The method of claim 14, comprising:

transmitting the second codeword of the second base codebook to a fixed device after a defined transit period; and tracking channel conditions using a precoding matrix based on the first codeword until a precoding matrix based on the second codeword is received from the fixed device.

* * * * *